(12) United States Patent
Sherman et al.

(10) Patent No.: US 9,157,376 B2
(45) Date of Patent: Oct. 13, 2015

(54) METHODS AND SYSTEMS FOR DETECTING AN OSCILLATION ERROR

(71) Applicant: General Electric Company, Schenectady, NY (US)

(72) Inventors: Scott Edward Sherman, Greenville, SC (US); Bryan Edward Sweet, Schenectady, NY (US); John Rogers Huey, Greenville, SC (US)

(73) Assignee: General Electric Company, Schenectady, NY (US)

( * ) Notice: Subject to any disclaimer, the term of this patent is extended or adjusted under 35 U.S.C. 154(b) by 424 days.

(21) Appl. No.: 13/633,644

(22) Filed: Oct. 2, 2012

(65) Prior Publication Data

US 2014/0094978 A1    Apr. 3, 2014

(51) Int. Cl.
*F02C 9/26* (2006.01)
*F02C 9/54* (2006.01)
*G01H 1/00* (2006.01)

(52) U.S. Cl.
CPC . *F02C 9/263* (2013.01); *F02C 9/54* (2013.01); *F05D 2260/80* (2013.01); *G01H 1/00* (2013.01)

(58) Field of Classification Search
USPC ........................................................ 700/287
See application file for complete search history.

(56) References Cited

U.S. PATENT DOCUMENTS 7,063,066 B2   6/2006  Wind
2010/0256888 A1  10/2010  Tong et al.

FOREIGN PATENT DOCUMENTS

WO        03060304 A1    7/2003

*Primary Examiner* — Carlos Ortiz Rodriguez
(74) *Attorney, Agent, or Firm* — Sutherland Asbill & Brennan LLP

(57) ABSTRACT

Methods and systems for detecting an oscillation error are provided. According to one embodiment, a system may include a controller, and a processor communicatively coupled to the controller. The processor may be configured to detect an oscillatory event and increment a delay timer based on a duration of the oscillatory event. The delay timer may be set to a predetermined delay value. Additionally, the processor may be configured to determine that the delay timer exceeds the predetermined delay value and, based on the determination, declare the oscillation error.

20 Claims, 11 Drawing Sheets

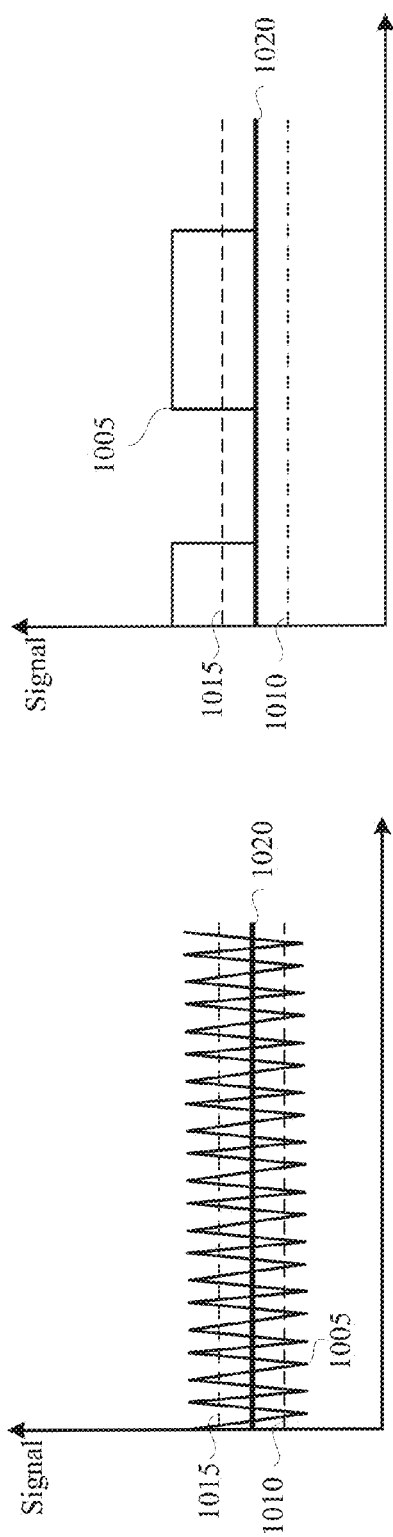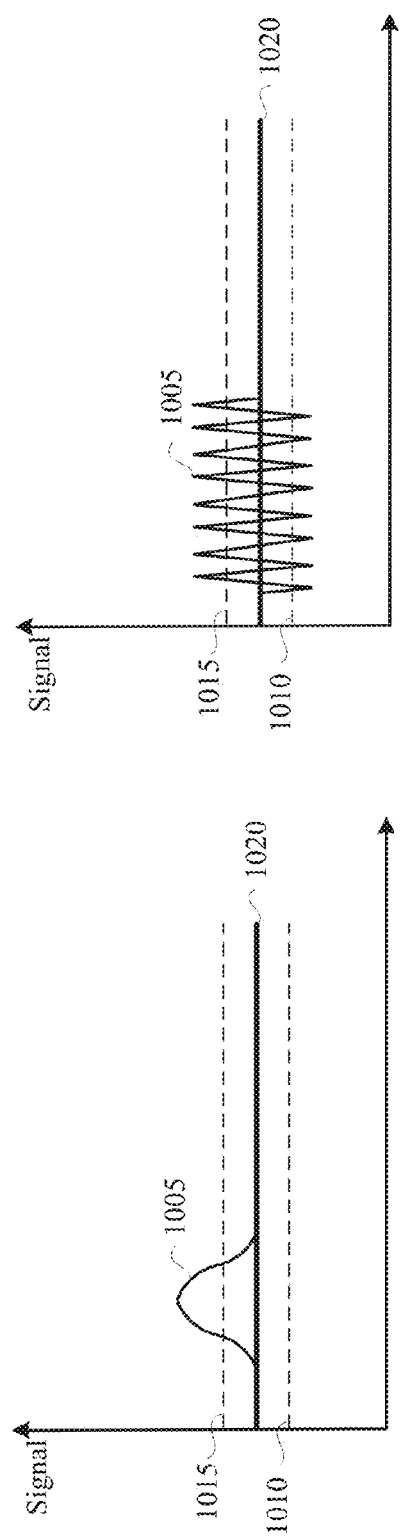
FIG. 10

METHODS AND SYSTEMS FOR DETECTING AN OSCILLATION ERROR

TECHNICAL FIELD

This disclosure relates generally to detecting errors in command signals, and more particularly, to methods and systems for detecting an oscillation error.

BACKGROUND

Various types of instability may be encountered during operation of a controlled system. Typically, a controller can generate reference command signals for transmission to various actuators to define positions of the actuators during the operation of the controlled system. Feedback received from the controlled system can include actual positions of the actuators in operation. These actual positions can be compared to the command signal to detect any discrepancies. The detected discrepancies may indicate that some instability exists and are used to declare errors.

FIG. 1 illustrates how, in some conventional systems, errors are declared based on predetermined thresholds and a period of time the instability lasts. As shown in FIG. 1, in operation 105, a controller provides a reference command signal to an actuator, and in operation 110, the controller monitors the feedback signal including the actual position of the actuator. In operation 115, the command signal and the feedback signal are compared to each other to determine whether any discrepancies are present and, if such discrepancies are present, it is determined whether the feedback signal exceeds thresholds in operation 120. When the feedback signal is within the thresholds, monitoring of the feedback signal continues. When the feedback signal exceeds any of the thresholds, a delay timer is activated in operation 125. The delay timer is incremented until the feedback signal exceeds thresholds.

The feedback signal is monitored for returning within thresholds in operation 130. In operation 135, the feedback signal is compared to the thresholds. When the feedback signal returns within the thresholds, the delay timer is reset in operation 140, and no error is declared. If the feedback signal does not return within thresholds in operation 135, the delay timer continues incrementing, until the predetermined value is reached. Thereafter, the delay timer expires in operation 145, and a steady state error is declared in operation 150.

FIG. 2 illustrates steady state error detection 200 by showing a signal in relation to time. A command reference signal defines a reference position 230 of a positioning device, such as an actuator, whereas a feedback signal shows an actual position 205 of an actuator. An upper threshold 215 and a lower threshold 210 determine acceptable deviations of the actual position 205 from the reference position 230. When the actual position 205 exceeds any thresholds, a delay timer starts incrementing 220 and increments until either the delay timer expires, or the actual position 205 returns within thresholds. When the delay timer expires, a steady state error is declared. If the actual position 205 is back within the thresholds before the delay timer expired, no error is declared.

Thus, conventional methods may allow detecting steady state errors. However, steady state errors are only one type of error encountered by actuators. Other types of errors include oscillatory type errors, which are characterized by fluctuations of the actual position of a positioning device in relation to the reference position or a steady state error. The oscillatory type errors may not be detected by the conventional methods described above, which simply reset the timer when the actual position 205 returns within the thresholds.

However, oscillatory errors, when severe enough, can lead to deviations from the desired system state, damage to system components, and potential system instability as well as poor performance.

BRIEF DESCRIPTION OF THE DISCLOSURE

The present disclosure relates to methods and systems for detecting an oscillation error. According to one embodiment, a method can be provided. The method can include detecting an oscillatory event and incrementing a delay timer based on a duration of the oscillatory event. The delay timer is set to a predetermined delay value. Additionally, the method can include determining that the delay timer exceeds the predetermined delay value and, based on the determination, declaring the oscillation error.

In one embodiment, a system can be provided. The system can include a controller and a processor communicatively coupled to the controller. The processor may be configured to detect an oscillatory event and increment a delay timer based on a duration of the oscillatory event. The delay timer is set to a predetermined delay value. The processor may be further configured to determine that the delay timer exceeds the predetermined delay value and, based on the determination, declare the oscillation error an actual position of the positioning device.

In yet another embodiment of the disclosure, another system is provided. The system may include a gas turbine, an actuator coupled to the gas turbine, a controller configured to control the gas turbine, and a processor communicatively coupled to the controller. The processor may be configured to detect an oscillatory event and increment a delay timer based on a duration of the oscillatory event. The delay timer is set to a predetermined delay value. The processor may be further configured to selectively decrement the delay timer when no oscillatory event is detected; selectively re-activate the delay timer based on a detection of a further oscillatory event; determine that the delay timer exceeds the predetermined delay value; and based on the determination, declare an oscillation error.

Other embodiments and aspects will become apparent from the following description taken in conjunction with the following drawings.

BRIEF DESCRIPTION OF THE DRAWINGS

FIGS. 10A-10D depict a representation of different types of tracking errors, in accordance with an embodiment of the disclosure.

DETAILED DESCRIPTION

The following detailed description includes references to the accompanying drawings, which form part of the detailed description. The drawings depict illustrations in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

The embodiments described herein relate to methods and systems for detecting an oscillatory event. Certain embodiments can provide for detecting an oscillatory event based on a feedback signal reflecting an actual position of a positioning device, such as an actuator, in response to a command signal setting a reference position of the positioning device. The command signal may be provided to the positioning device to set its reference position (i.e., target value). However, the actual position of the positioning device may differ from the reference position. To determine the actual position of the positioning device, the feedback signal may be monitored. The actual position may then be compared to the reference position. Allowable deviations of the actual position and the reference position may be set as an upper threshold and a lower threshold. When the actual position exceeds both upper and lower thresholds within a predetermined period of time, the oscillatory event may be declared.

The technical effects of certain embodiments of the disclosure may include reaching a stable system state. In particular, the technical effects of certain embodiments of the disclosure may include detecting oscillatory events to avoid system instability and damage to system components. Since detecting oscillatory events allows achieving a healthy and stable system state, further technical effects of certain embodiments of the disclosure may include increasing equipment life by eliminating failures and maloperation of the system.

Figure 1:
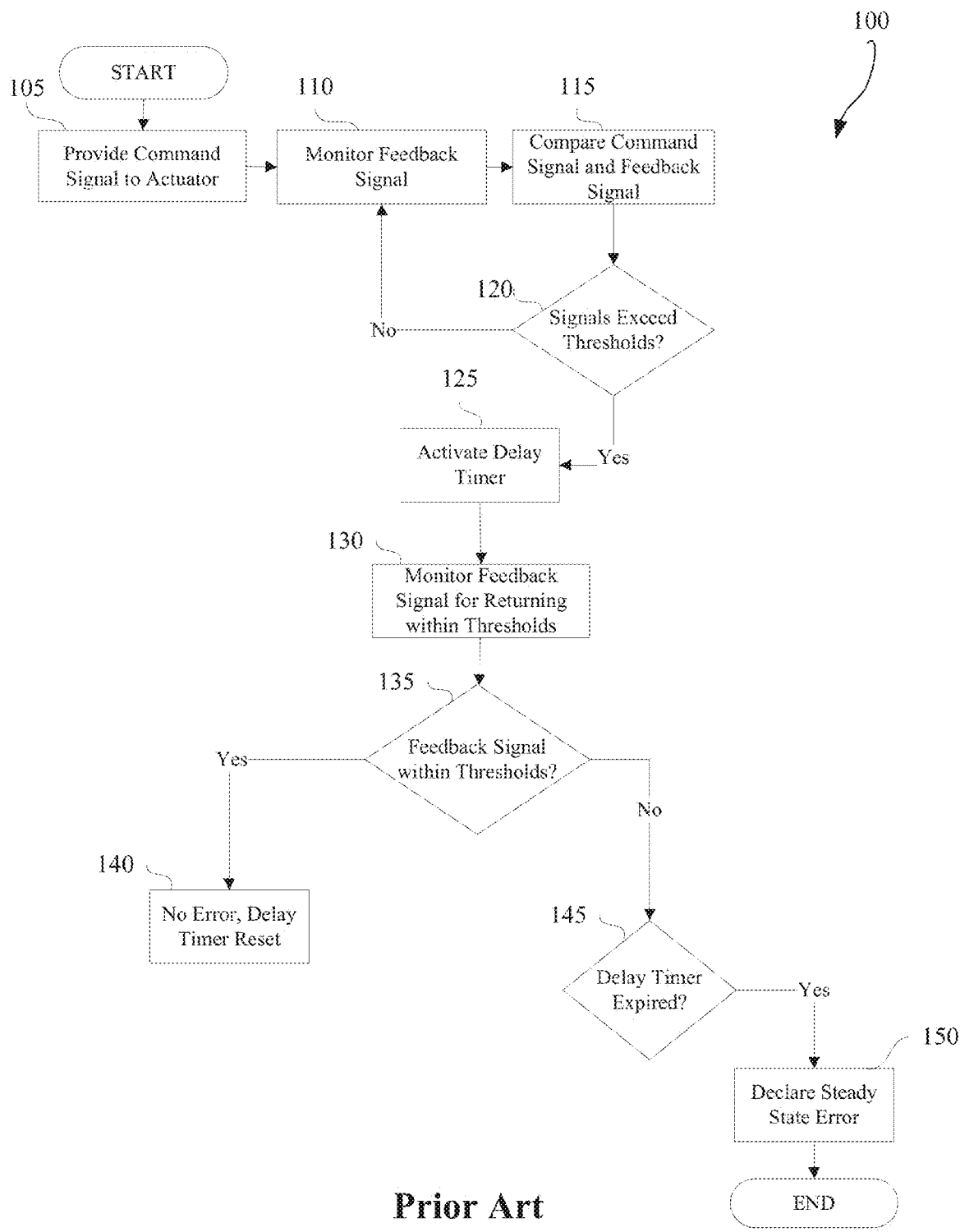
FIG. 1 depicts a simplified block diagram illustrating a conventional method for detecting steady state errors.
Figure 2:
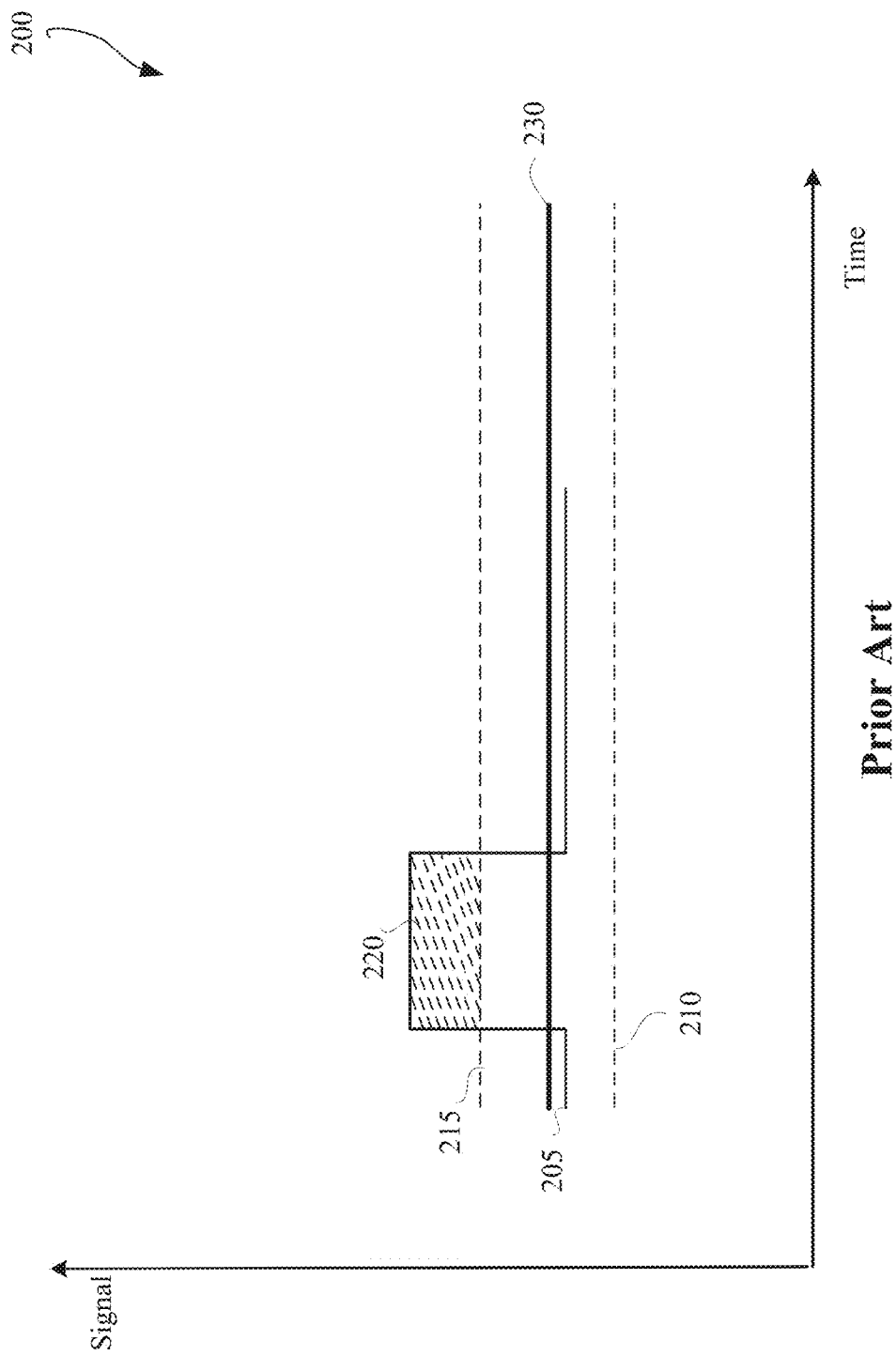
FIG. 2 depicts a representation of detecting steady state errors based on command and feedback signals.
Figure 3:
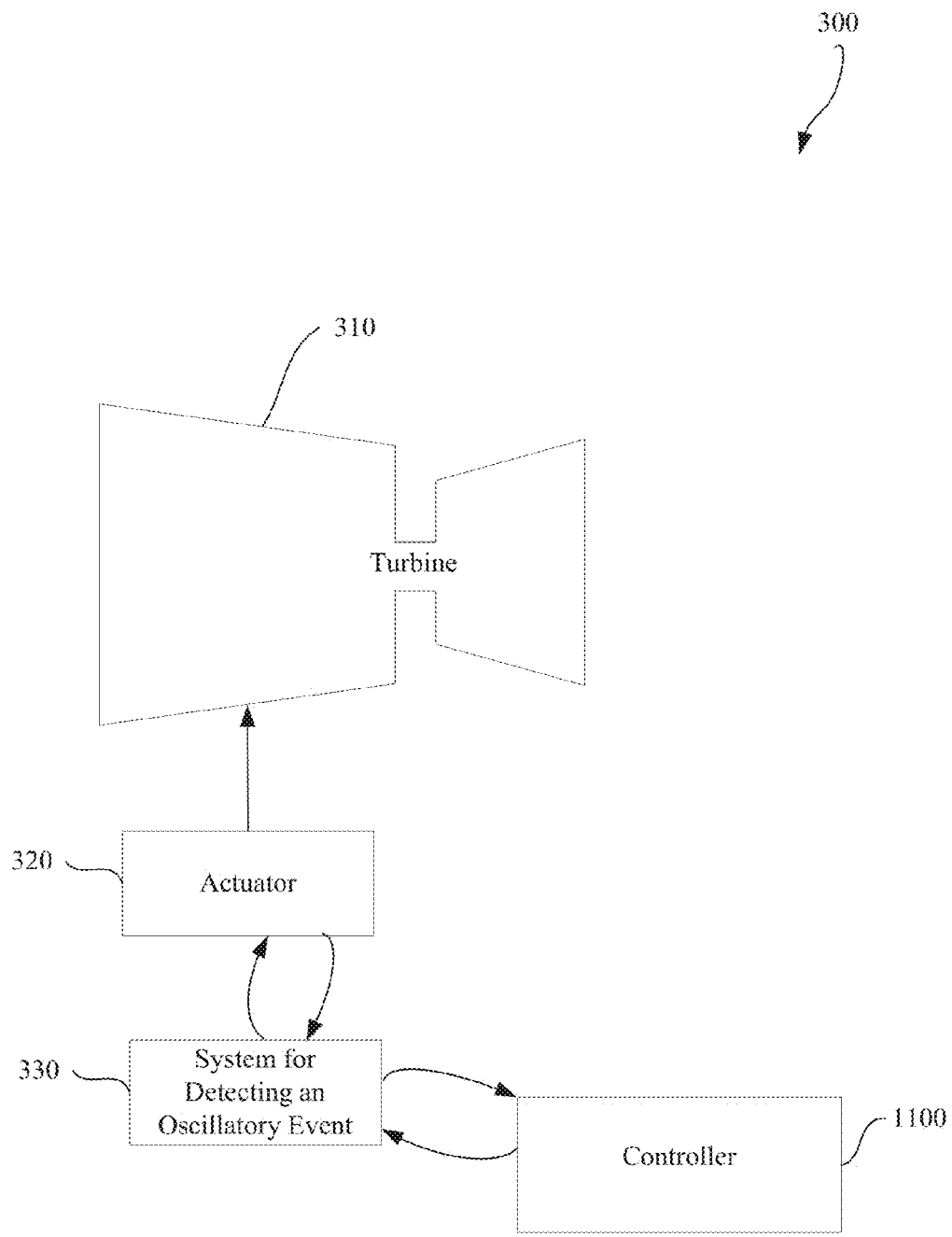
FIG. 3 depicts an example environment of the system for detecting an oscillatory event, in accordance with an embodiment of the disclosure.

Referring now to FIG. 3, a block diagram illustrates a system environment 300 suitable for implementing a method for detecting an oscillatory event, in accordance with one or more example embodiments. In particular, the system environment 300 may comprise a turbine 310, an actuator 320, a system for detecting an oscillatory event 330, and a controller 1100. The turbine 310 may include a gas turbine, a steam turbine, and so forth.

The controlled system in this environment is the turbine 310; however, the method for detecting an oscillatory event may be used for any controlled systems experiencing oscillation related issues.

The operation of the turbine 310 may be managed through the controller 1100. The controller 1100 may interact with the system for detecting an oscillatory event 330 to provide a command signal setting a reference position of the actuator 320; monitor a feedback signal responsive to the command signal, with the feedback signal including an actual position of the actuator 320; determine that the actual position is above a predetermined upper threshold and below a predetermined lower threshold within a predetermined period of time; and based on the determination, declare an oscillatory event.

In some example embodiments, the actuator 320 may include a fuel valve, a steam valve, a bleed valve, an inlet guide vane, a variable stator vane, and so forth.

In some example embodiments, when the controller 1100 sends a command to the actuator 320, for example, to open to 50%, the reference position thus defined for the actuator 320 (50% in this example) may be provided to the system for detecting an oscillatory event 330. The system 330 may then monitor a feedback signal received from the actuator 320, with the signal including the actual position of the actuator 320. For example, the actual position, at a certain moment, may be 53%. The actual position of the actuator 320 may be constantly compared to the reference position set by the command signal to detect deviations exceeding certain thresholds. The thresholds may be predetermined in relation to the reference position of the actuator 320. For example, the upper threshold may be set to +3% and the lower threshold to −3%. Thus, in this example, the actual position will be above the upper threshold when it is more than 53% and below the lower threshold when it is less than 47%.

Therefore, the oscillatory event may be detected, if the actual position of the actuator 320 exceeds 53% and goes below 47% within a predetermined period of time (for example, within 10 seconds).

Figure 4:
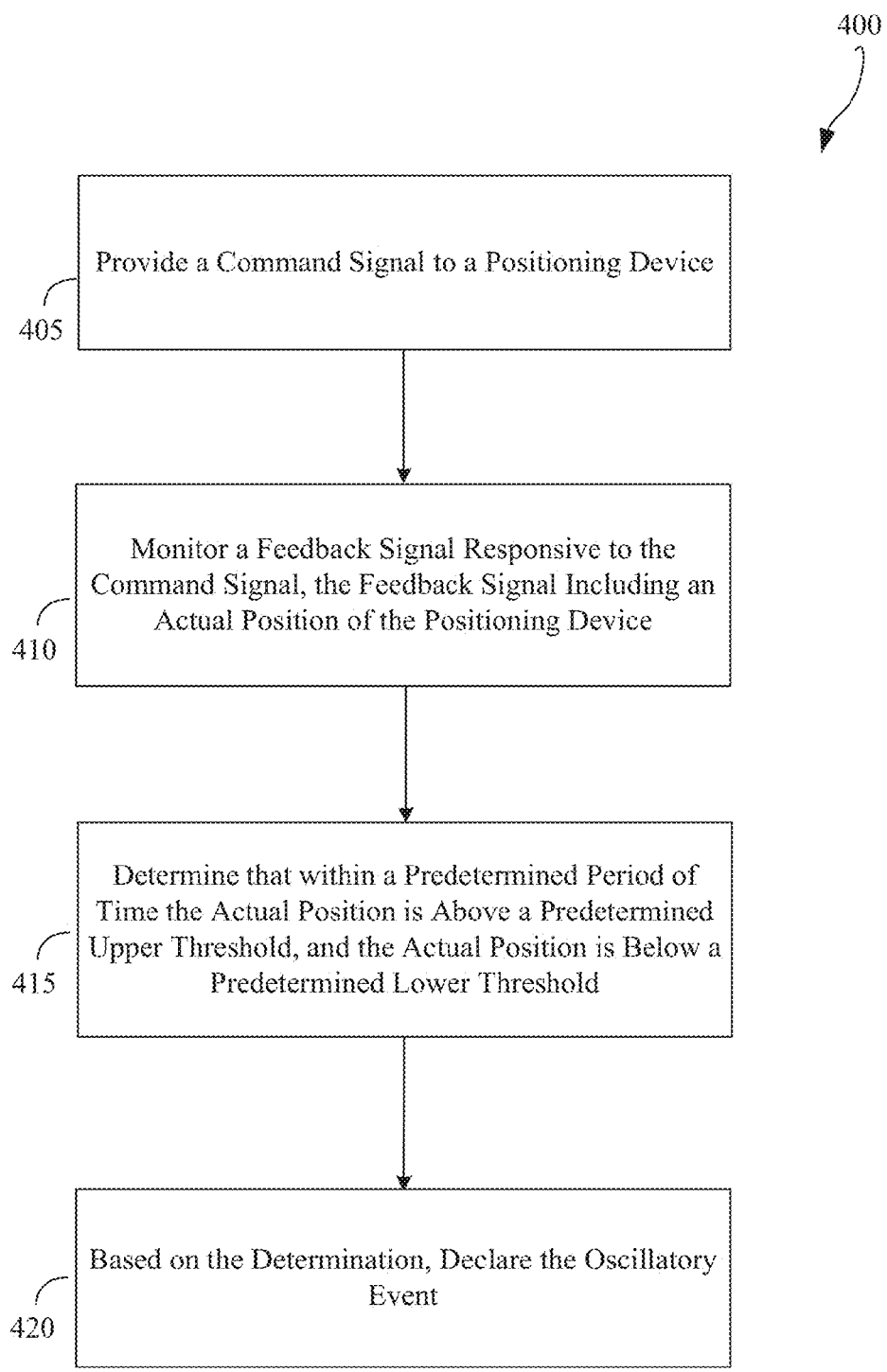
FIG. 4 depicts a process flow diagram illustrating an example method for detecting an oscillatory event, in accordance with an embodiment of the disclosure.

FIG. 4 depicts a process flow diagram illustrating an example method 400 for detecting an oscillatory event, in accordance with an embodiment of the disclosure. The method 400 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the controller 1100, which may reside in a user device or in a server. The controller 1100 may comprise processing logic. It will be appreciated by one of ordinary skill in the art that instructions said to be executed by the controller 1100 may, in fact, be retrieved and executed by one or more processors. The controller 1100 may also include memory cards, servers, and/or computer discs. Although the controller 1100 may be configured to perform one or more steps described herein, other control units may be utilized while still falling within the scope of various embodiments.

As shown in FIG. 4, the method 400 may commence in operation 405 with a controller providing a command signal to a positioning device. The positioning device may include one or more actuators, such as a fuel valve, a steam valve, a bleed valve, an inlet guide vane, a variable stator vane, and so forth. The command signal may set a reference position for the positioning device, thus determining its target value.

In operation 410, the controller may monitor a feedback signal responsive to the command signal, with the feedback signal including an actual position of the positioning device. The actual position may differ from the reference position set by the command signal for the positioning device. Such differences may pose risks to the performance and safety of the controlled system.

In operation 415, the controller may determine that within a predetermined period of time, the actual position is both above a predetermined upper threshold and below the predetermined lower threshold. This may indicate an abrupt change of the actual position of the positioning device associated with oscillatory events.

In operation 420, based on the determination, the oscillatory event may be declared. The declaring of the oscillatory event may trigger various monitoring or diagnostic actions.

Figure 5:
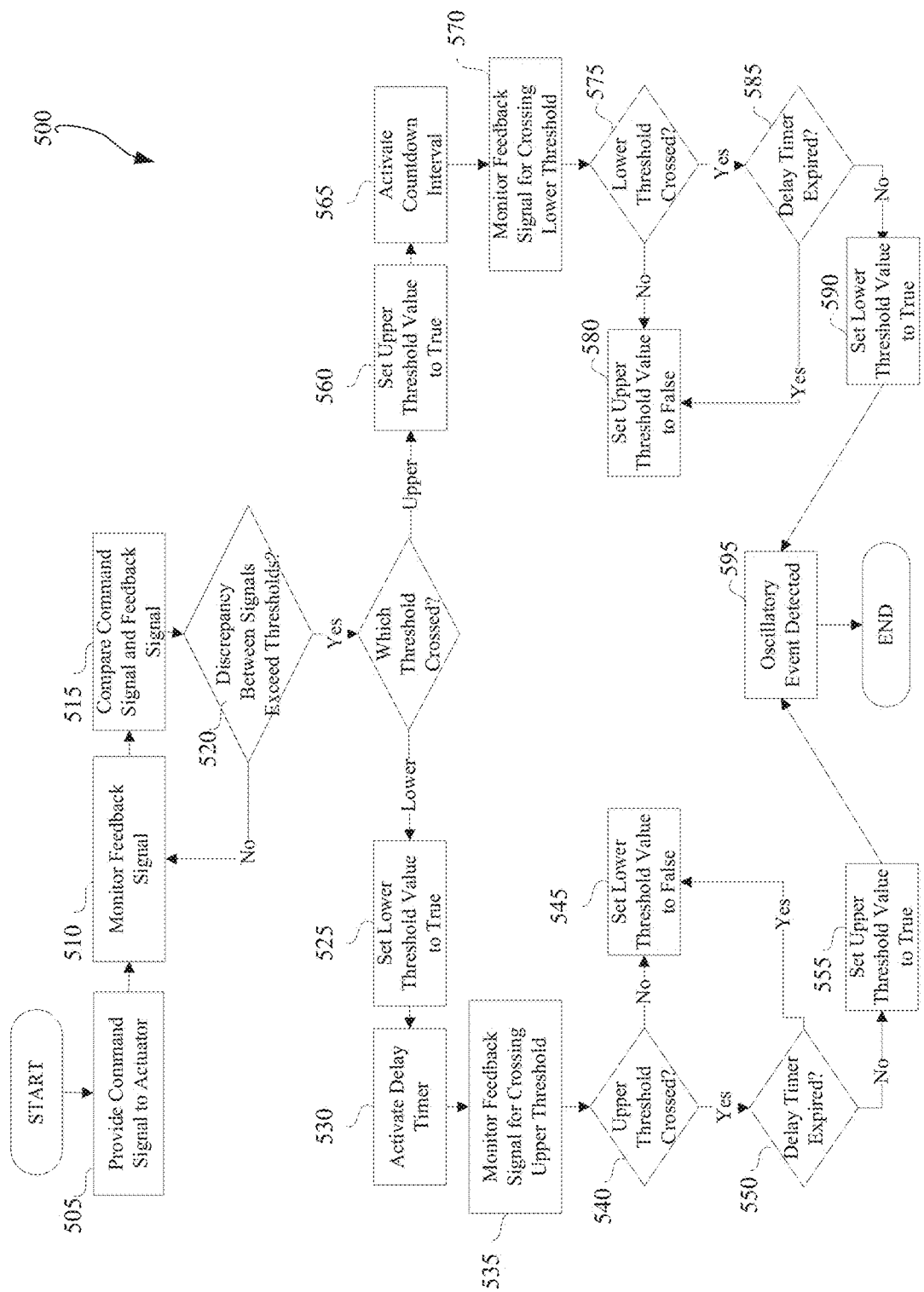
FIG. 5 depicts a process flow diagram illustrating a detailed example method for detecting an oscillatory event, in accordance with an embodiment of the disclosure.

FIG. 5 depicts a process flow diagram illustrating a detailed example method 500 for detecting an oscillatory event, in accordance with an embodiment of the disclosure. The method 500 may start in operation 505 with the controller providing a command signal to a positioning device, including an actuator, of a fuel valve, a steam valve, a bleed valve, an inlet guide vane, and a variable stator vane. The command signal may include a reference position that the actuator is commanded to take. In operation 510, a feedback signal may be monitored. The feedback signal may reflect an actual position that the actuator took. Then, in operation 515, the command signal and the feedback signal may be compared to determine a discrepancy between the signals. If the discrepancy between the signals does not exceed an upper or lower threshold in operation 520, monitoring of the feedback signal may continue. However, if the discrepancy between the signals exceeds the thresholds in operation 520, depending on which threshold is crossed, the method 500 may proceed with setting a lower threshold value to true in operation 525, or setting an upper threshold value to true in operation 560.

If the lower threshold value is set to true, a delay timer may be activated in operation 530. Then, in operation 535, the feedback signal may be monitored for crossing the upper threshold. If the upper threshold is crossed in operation 540, the delay timer is checked in operation 550. Then the upper threshold value is set to true in operation 555. If the delay timer is not expired in operation 550, it may be detected that both lower and upper thresholds are crossed within a period of time set for the delay timer. After that, an oscillatory event may be detected in operation 595. However, if the delay timer is expired in operation 550, when the upper threshold is crossed, the lower threshold value may be set to false in operation 545. In such a way, the delay timer is reset, and no oscillatory event is detected.

If the upper threshold value is set to true, a delay timer may be activated in operation 565. Then, in operation 570, the feedback signal may be monitored for crossing the lower threshold. If the lower threshold is crossed in operation 575, the delay timer is checked in operation 585. Then the lower threshold value is set to true in operation 590. If the delay timer is not expired, it may be detected that both lower and upper thresholds are crossed within a period of time set for the delay timer. After that, an oscillatory event may be detected in operation 595. However, if the delay timer is expired in operation 585, when the lower threshold is crossed, the upper threshold value may be set to false in operation 580. In such a way, the delay timer is reset, and no oscillatory event is detected.

Figure 6:
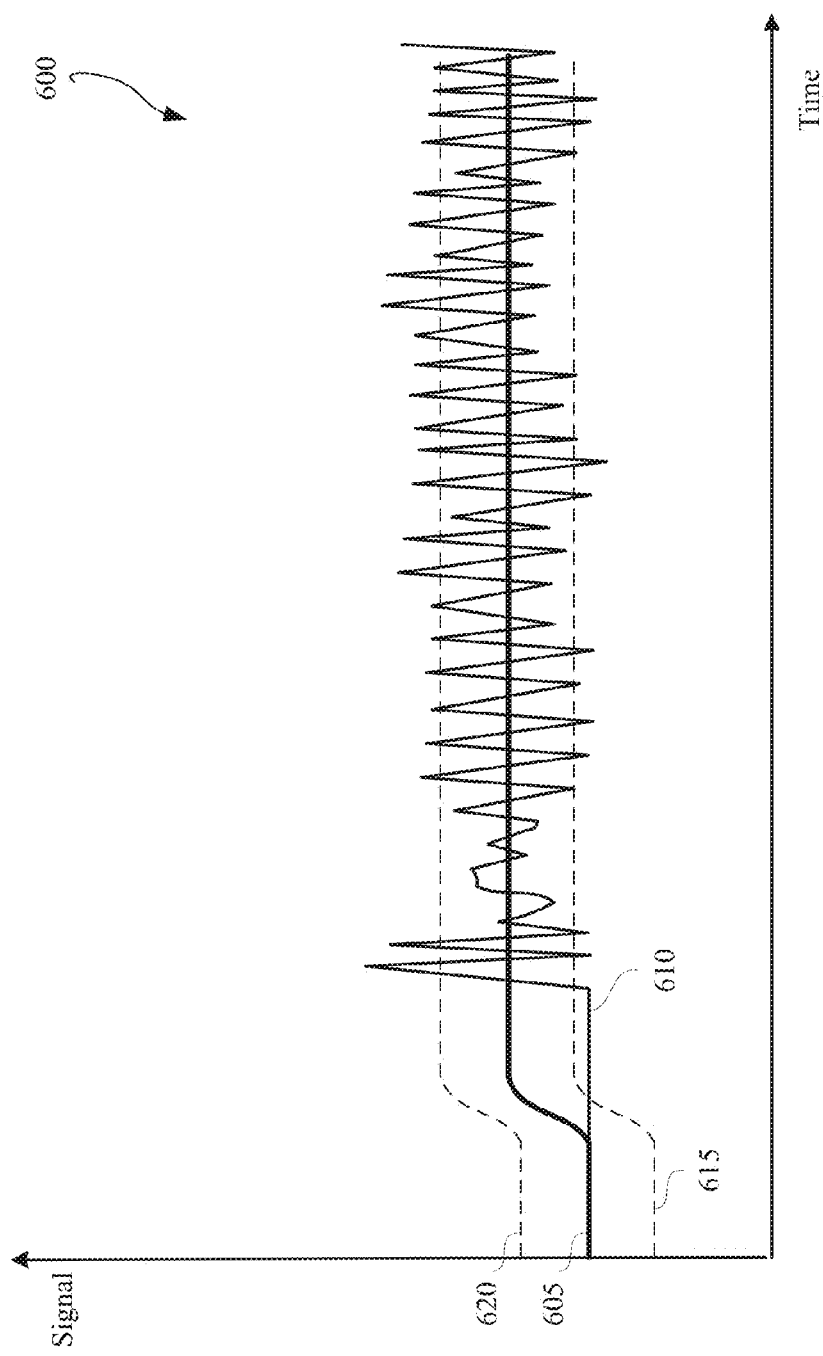
FIG. 6 depicts a representation of an oscillatory event, in accordance with an embodiment of the disclosure.

FIG. 6 depicts an exemplary representation of an oscillatory event 600, in accordance with an embodiment of the disclosure. A reference position 605 of the command signal defines a target for a position of an actuator. The reference position 605 may be fixed; it may remain the same irrespective of the changes of the actual position. An actual position 610 of the actuator may deviate from the reference position 605 defined by the command signal. An upper threshold 620 determines an upper allowable deviation of the actual position 610 from the reference position 605, and a lower threshold 615 determines a lower allowable deviation of the actual position 610 from the reference position 605.

In FIG. 6, the actual position 610 shows abrupt fluctuations characterized as oscillation. Such oscillatory behavior may cause system instability and damage to system components and is undesirable.

To detect an oscillatory event, the actual position 610 may be monitored in relation to the reference position 605, as well as the upper threshold 620 and the lower threshold 615. When the actual position 610 crosses the upper threshold 620, and then crosses the lower threshold 615 within a predetermined period of time (for example, 5 seconds), an oscillatory event may be detected. The same applies to the actual position 610 first crossing the lower threshold 615 and then the upper threshold 620.

Detection of an oscillatory event characterized by the actual position 610 crossing both thresholds within a predetermined period (a delay timer) may trigger follow up actions. Such follow up actions may be aimed at determining persistent or severe oscillatory events that present risks to the system and require diagnostic or protective actions including a system shutdown. When persistent or severe oscillatory events are detected, an oscillation error may be declared.

In some embodiments, the detection of an oscillatory event may trigger oscillation error detection. Oscillation error detection may be based on a delay timer that is not reset when an actual position of a positioning device returns within thresholds. Instead, the delay timer may decrement until it returns to the initial value (for example, zero) or the actual position of a positioning device exceeds thresholds again.

Figure 7:
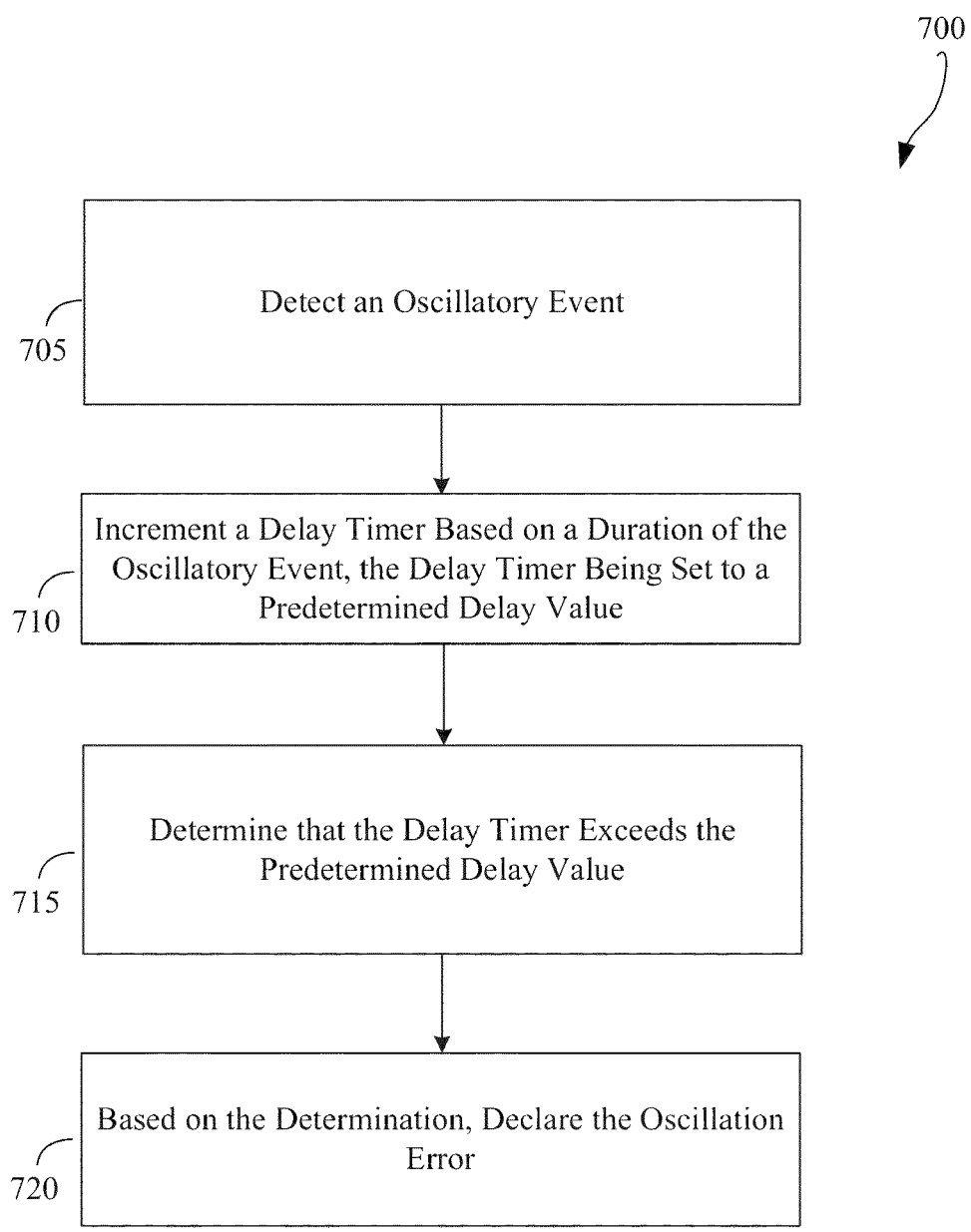
FIG. 7 depicts a process flow diagram illustrating an example method for detecting an oscillation error, in accordance with an embodiment of the disclosure.

FIG. 7 depicts a process flow diagram illustrating an example method 700 for detecting an oscillation error, in accordance with an embodiment of the disclosure. The method 700 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the controller 1100, which may reside in a user device or in a server. The controller 1100 may comprise processing logic. It will be appreciated by one of ordinary skill in the art that instructions said to be executed by the controller 1100 may, in fact, be retrieved and executed by one or more processors. The controller 1100 may also include memory cards, servers, and/or computer discs. Although the controller 1100 may be configured to perform one or more steps described herein, other control units may be utilized while still falling within the scope of various embodiments.

As shown in FIG. 7, the method 700 may commence in operation 705 with detecting an oscillatory event using the method described above. When the oscillatory event is detected, a delay timer may be activated. The delay timer may be set to a period of time corresponding to a predetermined delay value.

In operation 710, the delay timer may increment based on the duration of the oscillatory event. The count of the delay timer may increment during the period while the actual position of the positioning device exceeds any of the thresholds.

In some embodiments, when the actual position returns within thresholds, the delay timer may decrement until it reaches zero or the actual position again exceeds any of the thresholds. If the actual position repeatedly exceeds any threshold, the delay timer may start incrementing from where it is at the moment of the threshold crossing.

In other example embodiments, the delay timer may not start decrementing after the actual position returns within thresholds. The decrementing may start after a certain predetermined interval during which the delay timer pauses.

However, when the actual position returns within thresholds, the delay timer may start decrementing immediately without any pauses.

In operation 715, the controller may determine that the delay timer exceeds the predetermined delay value. The delay timer may increment to the predetermined delay value by means of accumulating the time of the predetermined delay value from several oscillations.

In operation 720, the oscillation error is declared based on the determination that the delay timer has expired. When the oscillation error is declared, various diagnostic or corrective actions may be taken.

In some embodiments, an alarm may be generated upon declaring the oscillation error. The alarm may inform an operation about the oscillation error, its parameters, and so forth.

In some embodiments, in response to the oscillation error, some protective actions may be initiated. For example, a system trip may be triggered, or system parameters may be modified, and so forth.

The actions initiated in response to the oscillation error may depend on certain predetermined conditions. The predetermined conditions may be related to parameters of the oscillation error, system state, and so forth.

Figure 8:
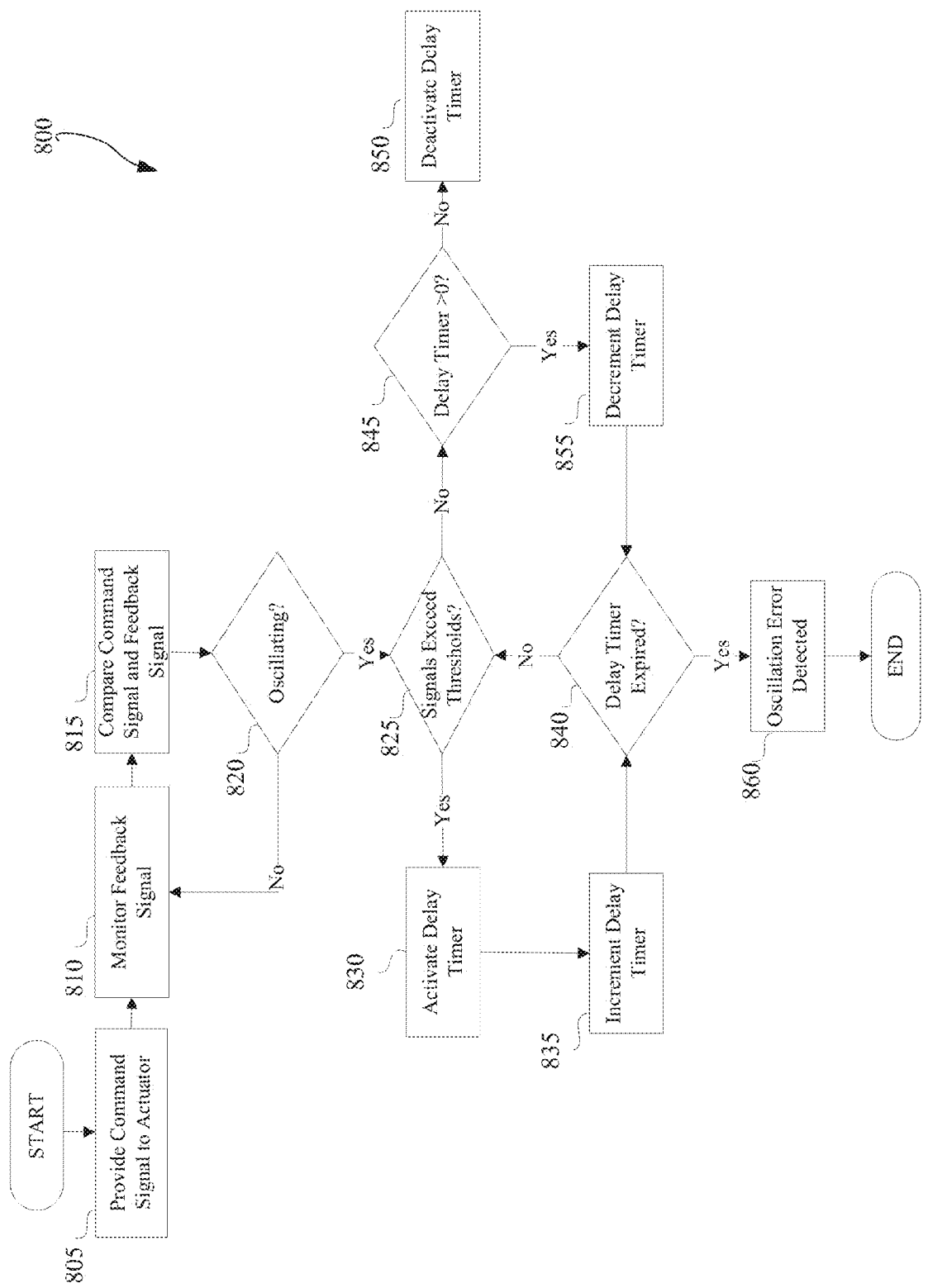
FIG. 8 depicts a process flow diagram illustrating a detailed example method for detecting an oscillation error, in accordance with an embodiment of the disclosure.

FIG. 8 depicts a process flow diagram illustrating a detailed example method 800 for detecting an oscillation error, in accordance with an embodiment of the disclosure. The method 800 may start in operation 805 with the controller providing a command signal to a positioning device, including an actuator, of a fuel valve, a steam valve, a bleed valve, an inlet guide vane, and a variable stator vane. The command signal may include a reference position that the actuator is commanded to take. In operation 810, a feedback signal may be monitored. The feedback signal may reflect an actual position that the actuator took. Then, in operation 815, the command signal and the feedback signal may be compared. If no oscillation is detected in operation 820, monitoring of the feedback signal may continue. Detection of oscillation may be performed using the method 400 described above.

If oscillation is detected, and the discrepancy between the signals exceeds the thresholds in operation 825, a delay timer may be activated in operation 830. Then, in operation 835, the delay timer may increment. Incrementing the delay timer may continue until the delay timer expires in operation 840. In this case, an oscillation error is detected in operation 860. However, if the delay timer is not expired in operation 840, and the discrepancy between the signals returns within thresholds in operation 825, the delay timer stops incrementing. The value of the delay timer is determined in operation 845. If it is more than zero, the delay timer decrements in operation 855. In some embodiments, the delay timer may start decrementing after a predetermined interval.

Decrementing of the delay timer prevents building up a delay value during a long period of time, thus avoiding short-term problems after which the system returns to a normal range. In such a way, false triggers, trips, and alarms may be eliminated.

The delay timer may be decrementing until the discrepancy between the signals exceeds thresholds or the count of the delay timer reaches zero. When the delay timer decrements to zero, the delay timer may be deactivated in operation 850.

However, when the discrepancy between the signals exceeds thresholds again, the decrementing stops, and the delay timer starts incrementing.

When the delay timer increments to a predetermined delay value and expires in operation 840, an oscillation error may be detected in operation 860. Detection of an oscillation error may generate an alarm, initiate various diagnostic and/or protective actions, and so forth.

Figure 9:
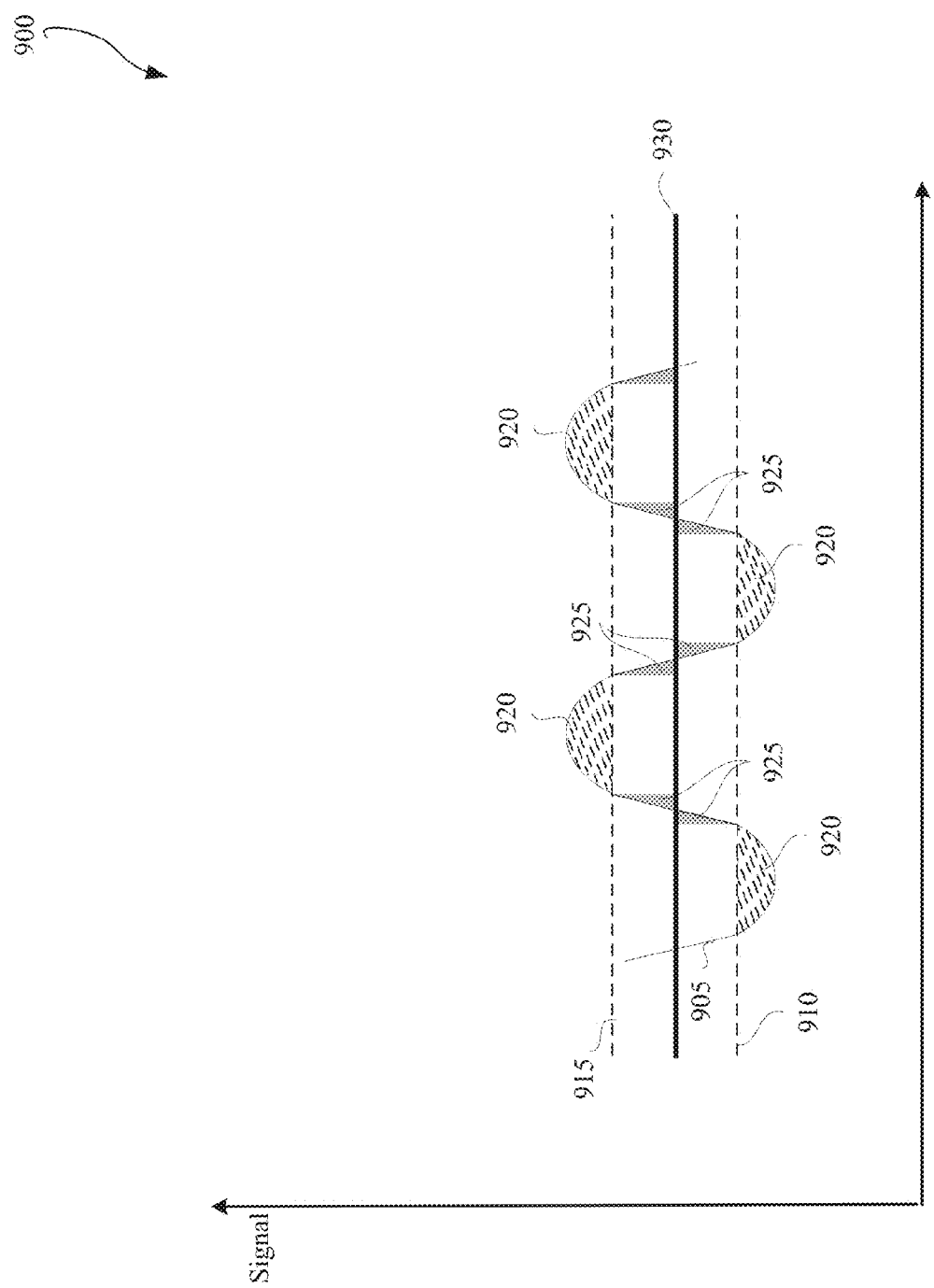
FIG. 9 depicts a representation of a delay timer reaction to changes of an actual position of a positioning device in relation to a reference position, in accordance with an embodiment of the disclosure.

FIG. 9 depicts a representation of a delay timer reaction to changes of an actual position of a positioning device in relation to a reference position, in accordance with an embodiment of the disclosure.

A reference position 930 reflects a target value of a positioning device set by a command signal. Allowable deviations of an actual position 905 of the positioning device are shown by an upper threshold 915 and a lower threshold 910. The actual position 905 is determined based on a feedback signal responsive to the command signal.

Oscillating behavior of the positioning device may be characterized by repetitive changes of the position. For example, when the reference position 930 of the positioning device is set to about 50%, the actual position 905 may repetitively change from about 45% to about 55%. This type of oscillatory behavior may result in poor performance, component degradation, and instability. Therefore, elimination of such behavior may be desirable.

Back to FIG. 9, the actual position 905 of the positioning device demonstrates oscillatory behavior, so detection of an oscillation error may be triggered by the detection of an oscillatory event (see FIG. 5).

When an oscillatory event is detected, a delay timer may be activated. The delay timer may start incrementing 920 after the actual position 905 goes below the lower threshold 910. The incrementing 920 may continue while the actual position 905 remains below the lower threshold 910. However, when the actual position 905 returns within the thresholds, the delay timer stops incrementing 920 and starts decrementing 925 from the value incremented at the moment. Thus, if the delay timer count is about 0.25 seconds at the moment when the actual position 905 returns within the thresholds, the delay timer may start counting down from 0.25 seconds.

In some embodiments, the delay timer may start decrementing 925 after a pause. That is, when the actual position 905 returns within the thresholds, the delay timer pauses during a predefined interval, and upon expiration of the predefined interval, the delay timer may start decrementing 925.

The delay timer decrementing 925 may continue when the actual position 905 again exceeds a threshold. The incrementing 920 may start from the value that the delay timer has at the moment of the actual position 905 exceeding a threshold again. For example, if the delay timer increments to about 0.25 seconds, then decrements to about 0.15 seconds, the incrementing may start from about 0.15 seconds at the moment when the actual position 905 exceeds a threshold again. Thus, the delay timer may accumulate oscillation time during the actual position 905 being over the thresholds. However, to prevent accumulation of the oscillation time during a long period of time, the oscillation time on the delay timer may decrease during the actual position 905 being within the thresholds.

Incrementing 920 and decrementing 925 may continue until either the delay timer decrements to an initial value (zero), or the delay timer increments to a predetermined delay value (for example, about 10 seconds).

If the delay timer decrements to the initial value, the delay timer may be reset, and no error may be declared. The oscillation may be considered non-persistent or not severe; thus, no diagnostic or protective actions will be taken.

However, if the delay timer increments to the predetermined delay value, an oscillation error may be detected, and relative diagnostic or protective actions may be taken. In some embodiments, on detection of an oscillation error, an alarm may be declared. In other embodiments, in addition to or instead of declaring an alarm, diagnostics may be triggered, the system may trip, and so forth.

In this manner, only sustained oscillatory events may be detected as oscillation errors. Other types of deviations of the actual position of a positioning device from its reference position may not be detected as oscillation errors.

Some exemplary types of tracking errors are shown in FIGS. 10A-10D. FIG. 10A depicts a sustained oscillation of a positioning device. An actual position 1005 of a positioning device quickly changes in relation to a reference position 1020 of the positioning device. In peak points, the actual position 1005 overrides both predetermined thresholds (an upper threshold 1015 and a lower threshold 1010). Moreover, such oscillating behavior is long-lasting, and thus may present risks. This type of tracking error may be characterized as oscillation and may be detected as oscillation errors.

FIG. 10B depicts a steady state error that may be detected by conventional means. A steady state error may be characterized by a steady deviation of the actual position 1005 of the positioning device in relation to the reference position 1020. In case of a steady state error, the actual position 1005 may exceed one of the thresholds 1015, 1010 and remain over the threshold during a predetermined period of time (for example, 10 seconds).

FIG. 10C depicts an occasional crossing of the upper threshold 1015, after which the system regains stability and the actual position 1005 comes close to the reference position 1020 of the positioning device. As only the upper threshold 1015 is crossed, the event may not be detected as an oscillatory event. In such a way, the event, if lasting enough, may be detected as a steady state error only.

FIG. 10D depicts a brief oscillatory event, after which the system regains stability and the actual position 1005 comes close to the reference position 1020 of the positioning device. In this case, both the upper threshold 1015 and the lower threshold 1010 are crossed, so an oscillatory event may be detected according to the method for detecting an oscillation event. However, the duration of the oscillatory event may be insufficient to detect it as an oscillatory error.

Figure 11:
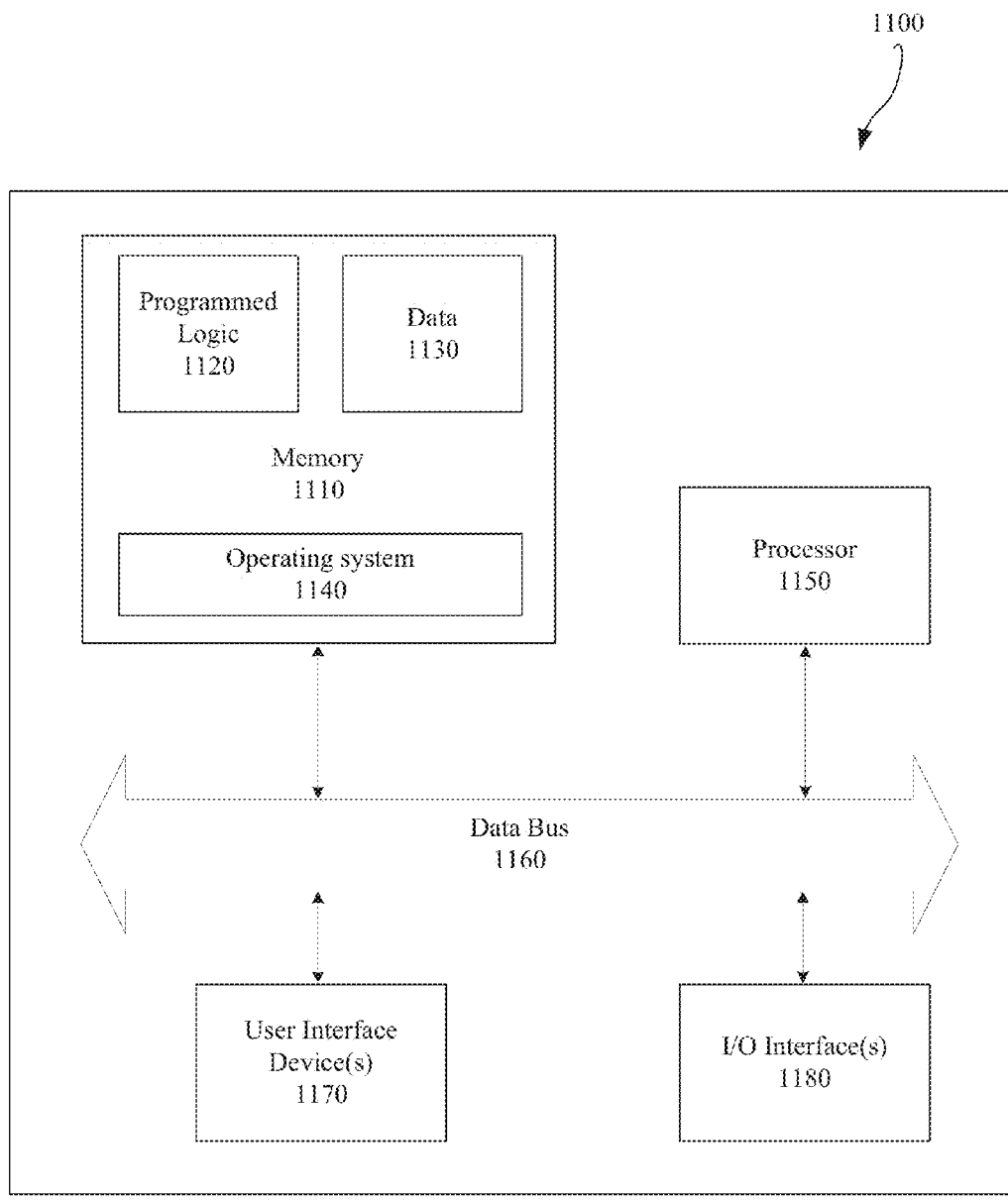
FIG. 11 depicts a block diagram illustrating a controller for controlling a controlled system, in accordance with an embodiment of the disclosure.

FIG. 11 depicts a block diagram illustrating a controller 1100 for controlling a turbine in accordance with an embodiment of the disclosure. More specifically, the elements of the controller 1100 may be used to detect an oscillatory event. The controller 1100 may include a memory 1110 that stores programmed logic 1120 (e.g., software) and may store data 1130, such as a reference position of the positioning device, an actual position of the positioning device, and the like. The memory 1110 also may include an operating system 1140. A processor 1150 may utilize the operating system 1140 to execute the programmed logic 1120, and in doing so, also may utilize the data 1130. A data bus 1160 may provide communication between the memory 1110 and the processor 1150. Users may interface with the controller 1100 via at least one user interface device 1170 such as a keyboard, mouse, control panel, or any other device capable of communicating data to and from the controller 1100. The controller 1100 may be in communication with the gas turbine online while operating, as well as in communication with the gas turbine offline while not operating, via an input/output (I/O) interface 1180. More specifically, one or more of the controllers 1100 may carry out the execution of the model-based controller, such as, but not limited to, providing a command signal to a positioning device, with the command signal including a reference position; monitoring a feedback signal responsive to the command signal, with the feedback signal including an actual position of the positioning device; determining that within a predetermined period of time the actual position is both above a predetermined upper threshold and below a predetermined lower threshold; and based at least in part on the determination, declaring the oscillatory event. Additionally, it should be appreciated that other external devices or multiple other gas turbines may be in communication with the controller 1100 via the I/O interface 1180. In the illustrated embodiment, the controller 1100 may be located remotely with respect to the gas turbine, although it may be co-located or even integrated with the gas turbine. Further, the controller 1100 and the programmed logic 1120 implemented thereby may include software, hardware, firmware, or any combination thereof. It should also be appreciated that multiple controllers 1100 may be used, whereby different features described herein may be executed on one or more different controllers 1100.

Accordingly, embodiments described herein allow detecting the oscillatory event, thus reducing detrimental effects to the controlled system, including poor performance, component degradation, system instability, and so forth. With a method for detecting oscillatory events, further actions associated with oscillations may be initiated.

References are made to block diagrams of systems, methods, apparatuses, and computer program products according to example embodiments. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions, which execute on the computer or other programmable data processing apparatus, create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based or programmable consumer electronics, mini-computers, mainframe computers, and so forth.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method for detecting an oscillation error, the method comprising:
   providing a command signal to a positioning device;
   monitoring a feedback signal responsive to the command signal, the feedback signal including an actual position of the positioning device;
   determining that the actual position is above a predetermined upper threshold and below a predetermined lower threshold;
   wherein when the actual position exceeds the predetermined upper threshold and the predetermined lower threshold, a delay timer starts incrementing and increments until a predetermined delay value;
   incrementing the delay timer based on a duration of an oscillatory event to obtain a delay timer incremented value;
   determining that the delay timer exceeds the predetermined delay value and that both the predetermined upper threshold and the predetermined lower threshold are exceeded;
   based at least in part on the determination, declaring the oscillation error;
   detecting an end of the oscillatory event; and
   based on the detecting, decrementing the delay timer starting from the delay timer incremented value;
   wherein when only one of the predetermined upper threshold and the predetermined lower threshold is exceeded and the oscillatory event is lasting for a predetermined amount of time, the oscillatory event is not declared.

2. The method of claim 1, wherein
the command signal includes a reference position.

3. The method of claim 1, further comprising decrementing the delay timer if no oscillatory event is detected.

4. The method of claim 3, further comprising deactivating the delay timer when the delay timer is decremented to zero.

5. The method of claim 4, further comprising re-activating the delay timer based on a further detection of a further oscillatory event.

6. The method of claim 1, further comprising generating an alarm in response to the oscillation error.

7. The method of claim 1, further comprising initiating a protective action in response to the oscillation error.

8. The method of claim 1, further comprising initiating a diagnostic action in response to the oscillation error.

9. The method of claim 1, wherein the oscillation error is detected within a gas turbine.

10. A system for detecting an oscillation error, the system comprising:
    a controller; and
    a processor communicatively coupled to the controller and configured to:
    provide a command signal to a positioning device;
    monitor a feedback signal responsive to the command signal, the feedback signal including an actual position of the positioning device;
    determine that the actual position is above a predetermined upper threshold and below a predetermined lower threshold;
    wherein when the actual position exceeds the predetermined upper threshold and the predetermined lower threshold, a delay timer starts incrementing and increments until a predetermined delay value;
    increment the delay timer based at least in part on a duration of an oscillatory event to obtain a delay timer incremented value;
    determine that the delay timer exceeds the predetermined delay value and that both the predetermined upper threshold and the predetermined lower threshold are exceeded;
    based at least in part on the determination, declare the oscillation error;
    detect an end of the oscillatory event; and
    based on the detecting, decrement the delay timer starting from the delay timer incremented value;
    wherein when only one of the predetermined upper threshold and the predetermined lower threshold is exceeded and the oscillatory event is lasting for a predetermined amount of time, the oscillatory event is not declared.

11. The system of claim 10, wherein
the command signal includes a reference position.

12. The system of claim 10, wherein the controller is further configured to control a gas turbine.

13. The system of claim 10, wherein the positioning device includes an actuator controlling one or more of a fuel valve, a steam valve, a bleed valve, an inlet guide vane, and a variable stator vane.

14. The system of claim 10, wherein the processor is further configured to decrement the delay timer when no oscillatory event is detected.

15. The system of claim 13, wherein the processor is further configured to deactivate the delay timer when the delay timer is decremented to zero.

16. The system of claim 14, wherein the processor is further configured to re-activate the delay timer based on a detection of a further oscillatory event.

17. The system of claim 10, wherein the processor is further configured to generate an alarm in response to the oscillation error.

18. The system of claim 10, wherein the processor is further configured to initiate a protective action in response to the oscillation error.

19. The system of claim 10, wherein the processor is further configured to initiate a diagnostic action in response to the oscillation error.

20. A system for detecting an oscillation error in a command signal in a gas turbine, the system comprising:
    a gas turbine;
    an actuator coupled to the gas turbine;
    a controller configured to control the gas turbine; and
    a processor communicatively coupled to the controller and configured to:
    provide a command signal to a positioning device;
    monitor a feedback signal responsive to the command signal, the feedback signal including an actual position of the positioning device;

determine that the actual position is above a predetermined upper threshold and below a predetermined lower threshold;

wherein when the actual position exceeds the predetermined upper threshold and the predetermined lower threshold, a delay timer starts incrementing and increments until a predetermined delay value;

increment the delay timer based at least in part on a duration of an oscillatory event to obtain a delay timer incremented value;

determine that the delay timer exceeds the predetermined delay value and that both the predetermined upper threshold and the predetermined lower threshold are exceeded;

based at least in part on the determination, declare the oscillation error;

detect an end of the oscillatory event; and based on the detecting, decrement the delay timer starting from the delay timer incremented value;

wherein when only one of the predetermined upper threshold and the predetermined lower threshold is exceeded and the oscillatory event is lasting for a predetermined amount of time, the oscillatory event is not declared.

* * * * *